United States Patent
Garfield

(10) Patent No.: US 6,328,064 B1
(45) Date of Patent: Dec. 11, 2001

(54) FLUID TANK DRAIN PIPE SUPPORT/GUIDE MEMBER

(75) Inventor: William L. Garfield, Chicago, IL (US)

(73) Assignee: GATX Rail Corporation, Chicago, IL (US)

( * ) Notice: Subject to any disclaimer, the term of this patent is extended or adjusted under 35 U.S.C. 154(b) by 0 days.

(21) Appl. No.: 09/708,868

(22) Filed: Nov. 8, 2000

(51) Int. Cl.$^7$ .................................................. B65D 87/24
(52) U.S. Cl. ...................... 137/590; 137/347; 137/350; 105/358
(58) Field of Search ................................... 137/590, 347, 137/350; 105/358

(56) References Cited

U.S. PATENT DOCUMENTS

| | | | | |
|---|---|---|---|---|
| 2,174,354 | * | 9/1939 | Shields | 137/358 |
| 4,184,511 | * | 1/1980 | Wilson | 137/590 |
| 4,237,928 | * | 12/1980 | Messersmith | 137/590 |
| 4,347,863 | * | 9/1982 | Keyes | 137/212 |

* cited by examiner

Primary Examiner—A. Michael Chambers

(74) Attorney, Agent, or Firm—Robert J. Depke; Mayer Brown & Platt

(57) ABSTRACT

A drain pipe support advantageously acts as a guide for insertion of a drain pipe and secures the drain pipe in a desired position for draining of a fluid filled tank. Additionally the drain pipe support also advantageously guides fluid into the drain pipe so that efficient draining may be accomplished. The drain pipe support is comprised of an interior hollow portion which includes a tapered central portion 34 at a lower end thereof in order to guide the drain pipe and form a seal between the drain pipe and the drain pipe support. The drain pipe support advantageously has a hollow body which includes a support member that extends from the upper sides of an outer wall of the body. The support member is desirably formed in a substantially uniform circumference around the body of the drain pipe support. This support maintains the desired stability for the drain pipe and a top portion of the support member advantageously provides a large footprint which prevents the insertion of the drainpipe into the tank from engaging a protective interior liner. The support member includes an outer lip that has one or more fluid channels which allow fluid communication between the interior of the tank and the side walls of the body. The body further includes an orifice in the lower portion thereof to allow fluid in the tank to transfer through the drainpipe away from the tank.

8 Claims, 1 Drawing Sheet

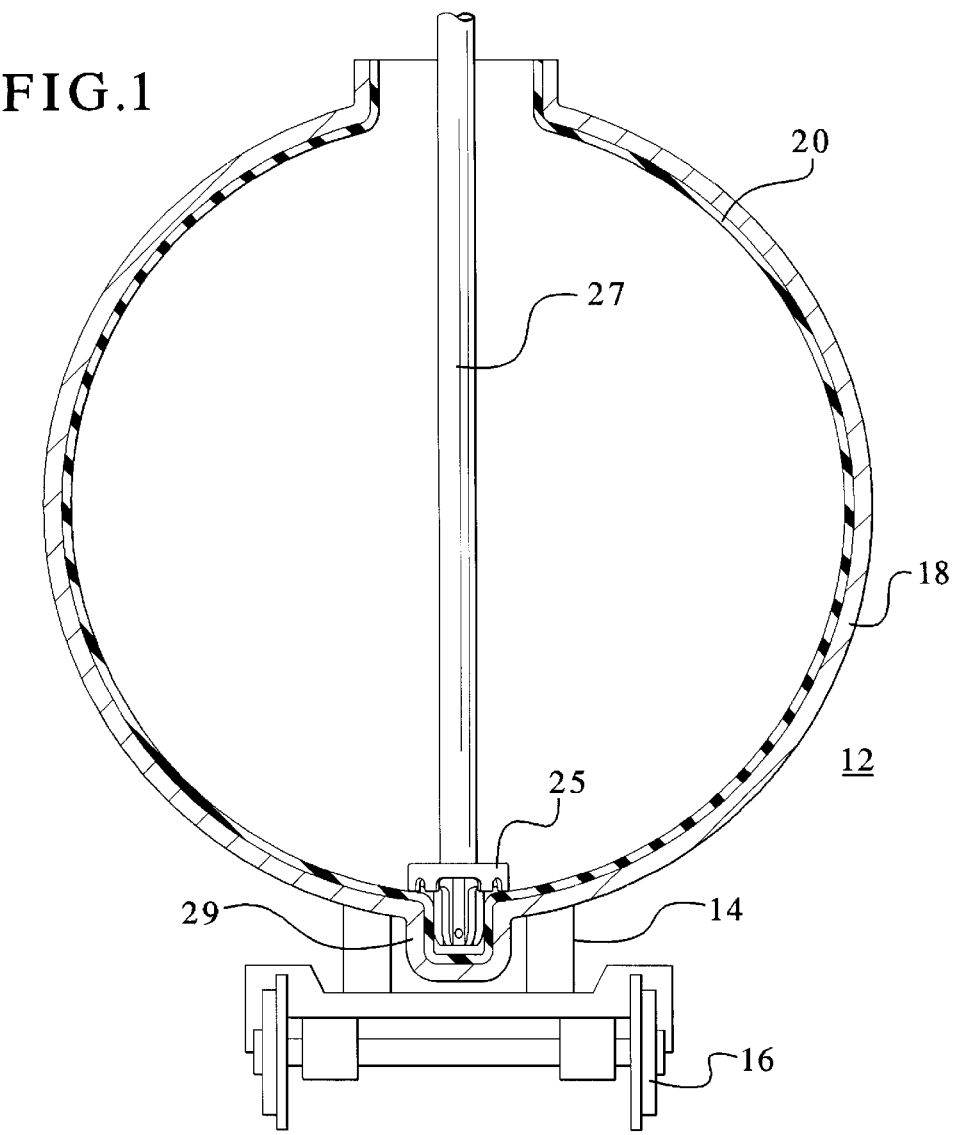
FIG.1
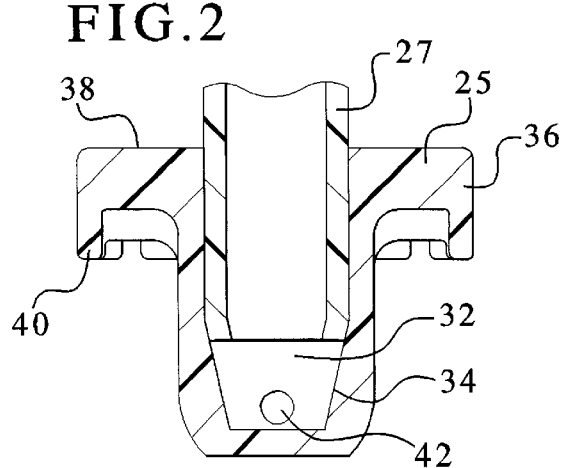
FIG.2
FIG.3

FLUID TANK DRAIN PIPE SUPPORT/GUIDE MEMBER

BACKGROUND OF THE INVENTION

1. Field of the Invention

The present invention relates generally to field of fluid holding and transportation containers. More specifically, the present invention is directed to an improved fluid tank drain pipe support/guide structure.

2. Description of the Related Art

There are a variety of well known designs for fluid holding and transportation tanks. In common railroad fluid transportation tank cars, it is well known to utilize a drain pipe for transferring fluid from the tank once the tank has reached its intended destination. In order to accomplish the removal of fluid from the tank car, a drain pipe is typically inserted into an opening in a top portion of the fluid filled tank. Conventional designs for railroad tank cars and other fluid containers usually include a lower trough or other depressed area beneath this opening that is designed to allow the fluid in the tank to accumulate in this lower region in order to ensure more complete drainage of the tank.

In conventional railroad tank cars, the fluid drain pipe is inserted through an opening in the top of the tank car into this lower trough or depression in the bottom of the tank car in order to ensure that the fluid may be almost completely removed from the tank. A fluid pump or other fluid flow generating mechanism is then used to draw fluid out of the tank through the drain pipe.

While this procedure in most instances poses no problems, it has been recognized that use of a drain pipe in this manner can result in a potentially catastrophic event should the fluid in the tank be a corrosive fluid such as an acid or the like. Fluid tanks and tank cars that are used in the transportation of a corrosive fluid such as acids and the like typically employ an inert liner that is usually formed of a rubber material. The rubber liner prevents the corrosive fluid from contacting and damaging the side walls of the fluid tank which are usually comprised of a metal such as steel. It is well known that the material of the tank side walls will react with certain corrosive fluids and acids which will ultimately corrode a leak path in the side of the tank if contact with the corrosive fluids is allowed to occur. It is nevertheless necessary that the tank cars be used for the transportation of both acids and other corrosive fluids.

One problem which can arise in these conventional tank cars is that the liner may wear or otherwise rupture leading to a leak of fluid in the tank into the space between the liner and the inner surface of the metal tank. Should this occur, it is often difficult to detect the presence of the fluid between the liner and the side wall of the tank. The first sign of such an occurrence may be when the corrosive fluid or acid in the tank corrodes a leak path through the side wall of the tank and the fluid leaks out onto the ground. Because the initial rupture is often undetected, the resulting tank shell failure can occur at any location with substantial adverse consequences. These consequences include the spillage of hazardous and/or toxic materials and may require evacuation of any individuals located near the spill site. It is obviously highly undesirable to have such an occurrence.

It has been discovered that the conventional approach to draining fluid tank cars set forth above can result in a rupture of the protective liner that is used in the transportation of corrosive fluids or acids. This occurs when the drain pipe is inserted too far into the tank resulting in contact between the drain pipe and liner. The contact is often sufficient to rupture the internal tank liner. This is compounded by the fact that the actual rupture of the inert liner may not be noticed for some period of time. As a result, there may be potentially dangerously results including damage or destruction of the tank and damage to the surrounding area at the time of the spill.

Previously, there has been no known structure for preventing these types of problems from occurring. The present inventor has overcome the shortcomings of the prior art and identified a new fluid tank drain support/guide which prevents rupture of the internal tank liner that is used in the transportation of corrosive fluids and acids.

One object of the present invention is to provide an improved drain pipe support/guide structure that prevents the insertion of a drain pipe into a fluid tank from damaging the interior inert tank side wall protective liner. Another object of the present invention is to provide a drain pipe support/guide that will allow fluid to freely flow from the fluid filled tank through the drain pipe support/guide. Another object of the present invention is to provide a drain pipe support/guide that will guide the drain pipe while it is being inserted into the fluid tank to prevent contact with the interior protective liner of the tank. Other objects and advantages of the present invention will be apparent from the following Summary and Detailed Description of the Presently Preferred embodiments.

SUMMARY OF THE PRESENT INVENTION

In accordance with the present invention an improved drain pipe support/guide structure prevents the insertion of a drain pipe into a fluid tank from damaging the interior liner. The novel structures of the present invention also allow fluid to freely flow from the fluid filled tank through the drain pipe support/guide and advantageously guides the drain pipe while it is being inserted into the fluid tank to prevent contact between the drain pipe and the interior protective liner of the tank.

The present invention is illustrated with respect to and has recognized applications in the railroad tank car industry. However, those skilled in the art will appreciate that the present invention may be utilized whenever a fluid filled tank is to be drained. It is preferred that the tank drain pipe support/guide of the present invention be comprised of a hard rubber or other durable inert material that will not react with corrosive fluids or acids that may be contained within the tank. For example, the drain pipe support/guide may alternately be comprised of an inert plastic or ceramic or glass material. Other materials may be recognized by those skilled in the art as well.

In accordance with the present invention, a hollow metal fluid filled tank includes a protective inert inner liner that covers the entire inner surface of the tank thereby preventing any contact between the side walls of the tank and any corrosive fluids or acids contained within the tank. The protective liner is employed in order to prevent corrosive fluids such as acids from corroding a leak path through the interior surface of the tank which is typically comprised of metal. The present application discloses a fluid tank drain pipe support/guide which acts as a guide and/or support for the drain pipe while also eliminating the potential for tearing the tank liner. In an exemplary embodiment, the drain pipe support/guide has a sufficiently large footprint to prevent the insertion of the drain pipe at an angle other than perpendicular to the floor of the tank from resulting in contact between the drain pipe and the protective inert liner located on the sidewall of the tank car.

The drain pipe support/guide advantageously serves several features. It acts as a guide for insertion of the drain pipe. In this regard, when the drain pipe is inserted, if inserted properly, the drain pipe will encounter little initial resistance as it enters the hollow central cavity of the drain pipe support/guide. Alternatively, upon insertion of the drain pipe, if the drain pipe does not encounter the hollow central core of the drain pipe support body, the drain pipe will hit the top surface of a support member that desirably surrounds the central core of the drain pipe support/guide body. This solid contact instantly alerts the individual inserting the drain pipe that the pipe must be adjusted so that it will properly enter the central hollow core of the drain pipe support/guide body. The drain pipe support/guide also desirably secures the drain pipe in a desired position for draining of the tank and also advantageously guides fluid flow into the drain pipe so that efficient draining may be accomplished.

The drain pipe support/guide is comprised of a body having an interior hollow portion which includes a tapered portion at a lower end thereof in order to further guide and form a seal between the drain pipe and the drain pipe support/guide when the drain pipe is inserted. The drain pipe is inserted into this drain pipe support/guide in order to facilitate removal of fluid from the tank. The drain pipe support/guide body includes a support member that extends from the upper sides of an outer wall of the drain pipe support/guide body. The support member is desirably formed in a substantially uniform circumference around the entire body of the drain pipe support/guide body. This serves several purposes including ease of manufacture and readily maintains a desired stability for the drain pipe and drain pipe support/guide.

A further advantage of this design is that the top portion of the support/guide member advantageously provides a large footprint which prevents the insertion of the drainpipe into the tank from engaging a protective interior liner. The tapered central hollow portion guides the drain pipe after it has been initially inserted into the drain pipe support/guide.

The support member includes an outer lip that has one or more fluid channels which allow fluid communication between the interior of the tank and the side walls of the drain pipe support/guide body. The drain pipe support/guide body further includes an orifice in the lower portion thereof to allow fluid in the tank to transfer through the drainpipe away from the tank. The drain pipe support/guide of the present invention is advantageously located in a bottom trough or cavity which is the lowest portion of the fluid tank. The support member portion of the body extends above the cavity or trough and makes contact with the inert protective liner located on the side walls of the tank adjacent the trough or cavity. Additionally, the drain pipe support/guide member contacts the portion of the liner that is located within the trough or cavity. The contact force between the drain pipe support/guide member and the liner is thereby greatly distributed and eliminates any additional wear on the liner thereby increasing its useful life.

Fluid channels are desirably formed within the support member and along the outer sides of the support/guide body in order to eliminate any resistance to fluid flowing from the tank into the drain pipe. The full scope of the present invention will be more clearly understood in light of the following detailed description of the presently preferred embodiments which are described with reference to the drawings wherein:

BRIEF DESCRIPTION OF THE DRAWINGS

FIG. 1 Illustrates a first preferred embodiment of the tank drain pipe support/guide of the present invention wherein the drain pipe support/guide has a drain pipe for a tank car inserted therein;

FIG. 2 Illustrates detail of a first exemplary embodiment of the present invention; and FIG. 3 Illustrates detail of a second alternate exemplary embodiment of the present invention.

DETAILED DESCRIPTION OF THE PRESENTLY PREFERRED EMBODIMENTS

FIG. 1 illustrates a first exemplary preferred embodiment of the present invention which is shown generally at 10. As shown in FIG. 10, the present invention is illustrated with respect to application for a railroad tank car which is shown generally at 12. The railroad tank car is comprised of a support base 14 mounted on sets of wheels 16 as is generally known in the art. A hollow metal tank 18 carries fluid for transportation across a network of rails.

In this exemplary embodiment, a protective liner 20 covers the entire inner surface of the tank car. The protective liner is employed in order to prevent corrosive fluids such as acids and the like from corroding a leak path through the interior surface of the tank which is typically comprised of metal. As recognized above, in the prior art, the use of a drain pipe to eliminate fluid from the tank has caused this liner to rupture by accidental contact between the drain pipe and the liner which results in a rip or hole in the liner during the process of transporting or draining the tank. This results in an undetected tear in the liner which allows the corrosive fluids to leak into a space between the liner and the metal tank. When this occurs, the acid or other corrosive fluids will corrode a leak path through the tank and ultimately result in a chemical spill at some later undetermined time.

The present invention overcomes this problem through the inclusion of a drain pipe support/guide 25 which acts as a guide and/or support for the drain pipe 27 while also eliminating the potential for tearing the tank liner 20. In this regard, in a preferred exemplary embodiment, the drain pipe support/guide member has a sufficiently large footprint on a top surface thereof to prevent improper insertion of the drain pipe 27 from resulting in contact between the drain pipe 27 and the protective liner 20 of the sidewall. This would occur, for example, if the drain pipe 27 were inserted such that it was not aligned with the hollow central core of the support/guide body 25. Specifically, this would occur if the drain pipe 27 were inserted at an angle other than ninety degrees such that it would extend to the side wall of the tank and not the cavity or depressed trough 29 of the tank car. The drain pipe support/guide 25 advantageously provides several desirable results. It acts as a guide for insertion of the drain pipe 27 and also may be used to solidly secures the drain pipe 27in a desired position for draining of the tank. The drain pipe support/guide 25 also advantageously guides fluid into the drain pipe 27 so that efficient draining may be accomplished.

FIG. 2 illustrates an exemplary preferred embodiment of the present invention in greater detail than the drain pipe support/guide illustrated in FIG. 1. FIG. 2 illustrates the drain pipe 27 inserted into the drain pipe support/guide 25. The drain pipe support/guide 25 is comprised of an interior hollow portion 32 which preferably includes a tapered portion 34 at a lower end thereof in order to further guide and form a seal between the drain pipe 27 and the drain pipe support/guide 25. The drain pipe support/guide body 25 advantageously has a hollow body which includes a support member 36 that extends from the upper sides of an outer wall of the body 25.

The support member 36 is desirably formed in a substantially uniform circumference around the body of the drain pipe support/guide 25. This serves several purposes including ease of manufacture and readily maintains a desired stability for the drain pipe. It should be recognized that the upper support member need not extend around the entire circumference. For example individual support arms could extend outward to provide the desired support for the overall structure. As shown in FIG. 1, the support member rests on the liner on the sides of the tank wall adjacent to the cavity or trough in the preferred embodiment. A further advantage of this design is that the top portion 38 of the support/guide member advantageously provides a large footprint which prevents the insertion of the drainpipe into the tank from engaging a protective interior liner.

The support member 36 includes an outer lip 40 that extends downward from the top of support member 36 and the lower portions of the lip members 40 are designed to rest on the surface of the tank side walls adjacent the trough or cavity 29 of the tank as show in FIG. 1. The support member 36 in conjunction with the outer lip structures 40 provide one or more fluid channels which allow fluid communication between the interior of the tank and the side walls of the drain pipe support/guide body 25. The drain pipe support/guide body 25 further includes an orifice 42 in the lower portion thereof to allow fluid in the tank to transfer through the drainpipe 27 away from the tank. It will be recognized that it is desirable to provide a plurality of fluid channels to reduce any resistance to fluid traveling from the tank through the channels and into the drain pipe 27.

FIG. 3 illustrates a further alternate preferred embodiment of the present invention wherein the fluid channels formed in the support member 36 and by gaps 43 between lip portions 40 of the support member 36 freely allow fluid to flow into the drain pipe 27. As shown in FIG. 3, it will be recognized that the gaps in the lip portions 43 need not be identical in size. As shown in the illustration, a large gap is formed adjacent two smaller gaps. The gaps may be placed symmetrically around the circumference of the body 25 or alternatively, the gap or gaps may be randomly arranged.

FIG. 3 also illustrates elongated protrusions 47 arranged substantially vertically on the outer side walls of the drain pipe support/guide body. These elongated protrusions preferably extend beneath the support member 36 so that they may provide reinforcing strength to the entire structure. These elements also act as guides for the unobstructed fluid flow into the drain pipe. It will be recognized by those skilled in the art that the raised members 47 can be desirably formed to match the geometry of the cavity or trough within which the drain pipe support/guide is located in order to ensure that the drain pipe support/guide 25 is secured within the cavity.

FIG. 3 also illustrates an alternate preferred arrangement for the orifice 42. It has been discovered that improved drainage of the tank car can be achieved by forming the orifice 42 as a slot in the side wall of the drain pipe support/guide body as shown in the illustration. FIG. 3 illustrates the preferred exemplary embodiment of the present invention and has been found to provide the best drainage characteristics.

When used throughout the specification, the reference to drain pipe support/guide is recognition of the fact that the structures disclosed herein may be used simply for guiding the drain pipe into a desired position while preventing damage to the internal tank car liner. Alternatively, the drain pipe support/guide structure of the present invention may also be used to provide support to the pipe when it is inserted to a tank car for removal of fluid from the tank.

I claim:

1. A drain pipe for a fluid filling tank comprising;
   a body having an outer side wall and a hollow central core;
   a support structure extending outward from a top portion of the outer wall of the hollow body;
   said support structure having a lower kip and at least one fluid channel extending from an edge of the support structure to the outer side wall of the body; and
   an orifice in a lower portion of the side wall of the body in fluid communication with the hollow central core wherein a bottom portion of the support structure rests on a bottom wall of the fluid filled tank.

2. The drain pipe guide for a fluid filled tank of claim 1, wherein the support structure extends in a substantially uniform circumference from a center of the body.

3. The drain pipe guide for a fluid filled tank of claim 1, wherein a plurality of fluid channels are provided within said support structure and extend from an edge of the support structure side wall to the side wall of the body.

4. The drain pipe guide for a fluid filled tank of claim 3, wherein the plurality of fluid channels are symmetrically opposed to one another around the body.

5. The drain pipe guide for a fluid filled tank of claim 2, wherein a plurality of fluid channels are provided within said support structure and extend from an edge of the support structure side wall to the side wall of the body.

6. The drain pipe guide for a fluid filled tank of claim 5, wherein the plurality of fluid channels are symmetrically opposed to one another around the body.

7. The drain pipe guide for a fluid filled tank of claim 1, further comprising:
   a plurality of elongated protrusions in the outer side wall of the body said elongated protrusions extending at least substantially vertically from a the support member to a bottom of the body.

8. The drain pipe guide of claim 1, wherein the orifice is comprised of a slot formed in a side wall of the body.

* * * * *

UNITED STATES PATENT AND TRADEMARK OFFICE
CERTIFICATE OF CORRECTION

PATENT NO. : 6,328,064 B1  Page 1 of 1
DATED : December 11, 2001
INVENTOR(S) : William L. Garfield It is certified that error appears in the above-identified patent and that said Letters Patent is hereby corrected as shown below:

Column 6,
Line 16, after "pipe" insert -- guide --;
Line 21, change "kip" to -- lip --.

Signed and Sealed this

Twenty-seventh Day of August, 2002

Attest:

Attesting Officer

JAMES E. ROGAN
Director of the United States Patent and Trademark Office